Sept. 2, 1958     P. KUSTUSCH     2,849,801
INTERNAL DIAMETER GAUGE

Filed Feb. 14, 1957     2 Sheets-Sheet 1

INVENTOR.
PAUL KUSTUSCH
BY
*Louis Chayka*
ATTORNEY

Sept. 2, 1958 P. KUSTUSCH 2,849,801
INTERNAL DIAMETER GAUGE
Filed Feb. 14, 1957 2 Sheets-Sheet 2

INVENTOR.
PAUL KUSTUSCH
BY Louis Chayka
ATTORNEY

United States Patent Office 2,849,801
Patented Sept. 2, 1958

2,849,801

INTERNAL DIAMETER GAUGE

Paul Kustusch, Grosse Pointe, Mich.

Application February 14, 1957, Serial No. 640,177

4 Claims. (Cl. 33—178)

My improvement pertains to a gauge known as a plug gauge and used in ascertaining the diameter of a tube or a bore in a solid object.

The object of my invention is to provide an instrument capable of indicating minute variations of the diameters to be measured in units of linear measurement exceeding in length by many times the lengths of the actual variations.

Furthermore, the object of my invention is to provide a gauge in which the magnified distance of an actual variation in a given case may be indicated instantly in calibrations along a movable rod which forms a part of the mechanism of the instrument and which is adapted to be actuated by mere finger pressure endwise upon said rod.

I have attained the above objects by what I call differential thread means, including as principal elements two members in a telescopic relation to each other, one of which members is provided with single helical thread, preferably within the space of a standard unit of length, such as an inch or half an inch, while the other element is provided with a plurality of threads for the same linear length, the two elements being adapted to be rotated as a unit about the common axis of both. In combination with the two elements I employ an elongated cone axially mounted upon the last-named element and a plurality of balls in a radial relation to the cone, the balls being adapted to be radially displaced by the longitudinal movement of the cone.

The advantages and other objects not named herein specifically will become obvious in the course of the following disclosure made with reference to the accompanying drawings in which.

Similar numerals refer to similar parts throughout the several views.

The gauge is a substantially tubular instrument in which the operative elements are enclosed in a tubular housing 10. The housing contains an axial bore 11 which at one end is threaded, as shown at 11a. At its opposite end a portion of the housing is cut off in a diametrical plane of said housing so that the remaining portion forms a shell 12, the shell being semi-circular in cross-section. The wall of the shell in the plane of the cut is defined by two oblong surfaces 13, each of which is provided with calibrations, as shown in Fig. 2.

Figure 5:
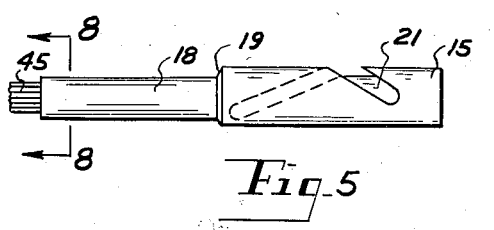
Fig. 5 is a side elevational view of a plunger which is a component element of the gauge as seen from line 5—5 in Fig. 7.
Figure 6:
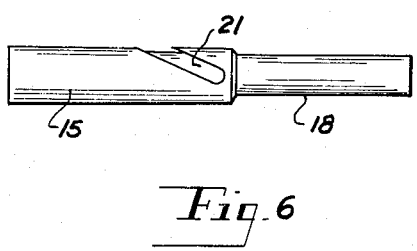
Fig. 6 is also a side elevational view of the same plunger as seen from line 6—6 of Fig. 7.

Axially fitting into the bore is a plunger 15, best shown in Fig. 5, this being a substantially tubular member which at one end extends up to the transverse face 14 at the junction of the main body of the housing 10 with the shell 12. At this end the plunger, which is of a diameter to be in contact with the inner surface of the bore 11, is provided with an axial bore 16, the bore being expanded and threaded at the end adjoining the shell, as shown at 17. The remaining portion 18 of the plunger, beginning at a point midway the length thereof, is of a reduced diameter. The abrupt reduction of the diameter of said portion 18 results in the formation of a shoulder 19, to which I shall refer again, and leaves a free space about said portion 18.

Figure 1:
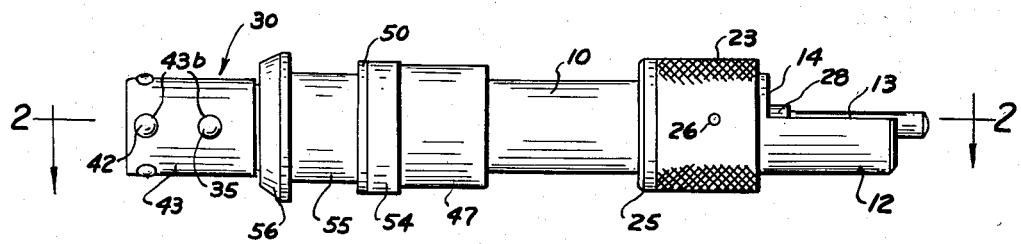
Fig. 1 is a side elevational view of my gauge.
Figure 2:
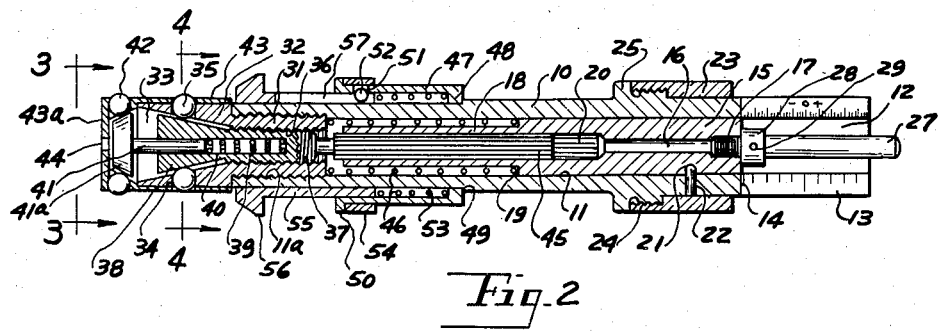
Fig. 2 is a longitudinal sectional view of the gauge on line 2—2 of Fig. 1.
Figure 3:
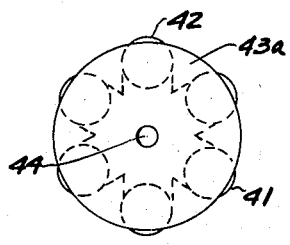
Fig. 3 is an enlarged sectional view on line 3—3 of Fig. 2.
Figure 4:
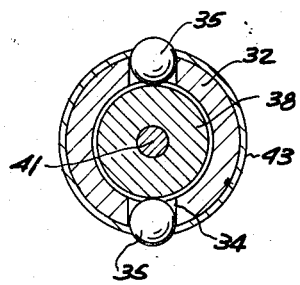
Fig. 4 is an enlarged sectional view on line 4—4 of Fig. 2.
Figure 7:
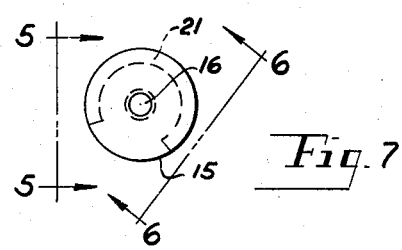
Fig. 7 is an enlarged end view of the plunger shown in Fig. 5.
Figure 8:
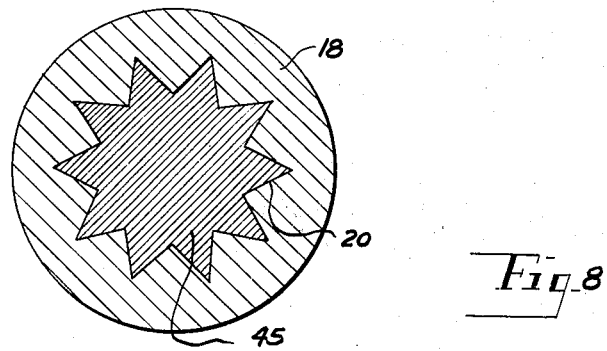
Fig. 8 is an enlarged transverse sectional view of the plunger on line 8—8 of Fig. 5.

The interior of the plunger, beginning at the end remote from the shell 12 to a point beyond the shoulder 19, is fluted or serrated longitudinally, as best shown at 20 in both Figs. 2 and 8. The wall of the plunger, in the portion adjoining the shell 12, is provided with a helical groove 21 in its outer surface, defining a curve of somewhat more than 180 degrees. This is shown in Fig. 7. Projecting into the groove from the wall of the casing is a pin 22. A collar 23 encircles that portion of the housing which contains said pin, and is secured in place by being threaded over a correspondingly threaded portion 24 of the housing, which also includes a flange 25 for abutment with one end of said collar. A set screw 26 may be used to prevent rotation of the collar on said housing.

Threaded into the bore, as shown at 17, is a rod 27. The rod includes a collar 28 serving as a stop to limit the longitudinal movement of said rod, the collar being provided with an air hole 29 for venting the axial bore 16. The rod, as shown in the drawing, normally extends from the plunger outwardly beyond the end of said shell 12.

Axially secured within the threaded end of the housing is a head, identified generally by numeral 30. The head includes a shank 31 which is threaded externally for engagement with the threads 11a of the housing and a cylindrical member or cylinder 32 axially extending from the shank and containing a cone-shaped cavity 33 which flares outwardly towards the outer end of said cylinder. The cylinder is provided with two diametrically-opposed apertures 34, each of them containing a ball 35 adapted to extend out of said cavity outwardly beyond the outer surface of said cylinder. The shank 31 is also threaded internally, as shown at 36, and axially disposed therein is a stem 37 which is threaded externally to a pitch including a plurality of threads along a length equal to the length of the portion of the plunger which is provided with a single helical groove 21.

It will be understood that the balls 35 may be substituted by equivalent movable elements, such, for instance, as pins.

At its outer end the stem 37 is integrally connected to the constricted end of a frusto-cone or expander 38, the outer surface of which bears against said balls 35. An axial bore 39 within the cone 38 and stem 37 contains a coiled spring 40, the spring bearing endwise against a pin 41 which extends from the bore and supports a frusto-conical head 41a. The side surface of the head 41a bears against a plurality of balls 42, said head 41a tapering in diameter in a direction opposite to that of the taper of said cone 38. A cup-shaped jacket 43 encloses the cylindrical member 32 and the head 41a, including the balls 35 and the balls 42, respectively. The jacket is in a fixed position upon the member 32, but includes openings 43b for each of the balls, permitting said balls to project outwardly beyond its outer surface. Additionally, the end wall 43a of the jacket contains a central aperture 44. Extending from the stem 37 into the fluted bore, as shown at 20, of the plunger 15 is a fluted shaft 45 for a telescopic sliding movement within said plunger. Disposed within the free space about said plunger, specifically, about its diametrically-reduced portion 18, is a coiled spring 46 which, at one end, bears against said shoulder 19, while the other end of the spring bears against the inner end of the shank 31 of the cylindrical member 32.

Mounted upon the outer surface of the housing 10 is a sleeve 47, the sleeve including an annular, inwardly-turned flange 48 for contact with the surface of the housing, thus leaving the wall of the sleeve in a spaced relation to the housing. The flange is in abutment with an integrally-formed shoulder 49 on the outer surface of said housing. At the opposite end the sleeve includes an outwardly-turned flange 50. Close to said flange the sleeve contains an aperture 51 for reception of a ball 52, a part of which bears against the outer surface of the housing 10, while a part of it projects into said aperture 51. Disposed within the free space between the wall of the sleeve and the outer surface of the housing is a coiled spring 53 which is kept against displacement by said ball 52. A ring 54, embracing the sleeve as shown in Fig. 2, prevents displacement of said ball 52.

Slidingly disposed upon the housing 10 and telescopically extending into the free space between the wall of the sleeve and the outer surface of the housing is a sliding cylindrical member 55, the member including at one end remote from the sleeve 47 an outwardly-turned annular lip or flange 56. The wall of the sliding cylindrical member 55 is provided with a longitudinal slot 57 which is wide enough to accommodate said ball 52 so that the member 55 may move telescopically into said sleeve 47.

Prior to the description of the operation of the gauge, I wish to point out that the outer end of the plunger 15, when said plunger is in its normal inoperative position, extends up to the outer end of the shell 12 at one end of the housing.

In its preferred form the plunger is provided with a helical groove of such a pitch that the longitudinal movement of the plunger to the distance of one inch will impart to the plunger a rotation to the extent of 180 degrees, while the stem 37, being slidingly keyed to the plunger 15 by means of the serrations, moves longitudinally with a much smaller ratio, this ratio being dependent upon the pitch of thread or so-called helix angle of thread, which in this instance is equivalent to 20 threads per inch. Therefore, in this instance, the relation of longitudinal movement between plunger 15 and stem 37 is 40 to 1. Of course, this ratio may be changed to become either larger or smaller, dependent upon the helical angle of the plunger 15 or the pitch of thread of stem 37, or both.

It will be assumed now that the gauge is to be used to ascertain whether the diameter of a respective bore is accurate or whether it differs on the plus or minus side of an accepted standard. For this purpose the operator of the instrument while holding the collar 23 against rotation will depress the plunger 15 by means of rod 27 into housing 10, endwise, as far as it will go. Then, in this state, with gauging balls 35 completely relaxed, the operator will push the instrument into the bore to be checked, so that the flange 56 will come in contact with the edge of the bore. As the flange is a part of the sliding member 55 which fits telescopically into the sleeve 47, it is possible to push the instrument into the bore till the flange 50 will come into abutment with said flange 56. Once the instrument has been inserted into said bore, it will be thus centered therein by means of said balls 42 under the action of the head 41a and secondly by the flange 56. As these two centralizing devices are well known, they won't require any further description.

At this stage the operator will release rod 37, whereupon the plunger 15, actuated by spring 46, will move back towards its position shown in Fig. 2, but will be halted when balls 35 will come into gauging contact with the wall of the bore to be gauged.

As the plunger is in a telescopic relation with the fluted shaft 45, it will, in the course of its longitudinal movement, slide over said shaft, but because of the helical groove which is in engagement with the radial pin 22, said plunger will also turn about its axis. The shaft 45, because of the fluted connection with the plunger, will rotate with the plunger as a unit.

Now, assuming that the inward displacement of the plunger relative to its position in Fig. 2 amounts to one-fifth of an inch, the distance to which the cone 38 will move forward and longitudinally in the same direction, according to the above-said relation of one to forty, will be but $\frac{1}{200}$ of an inch. Assuming now that the inclined surface of the cone 38 is five times longer than the height of the incline as measured from the base thereof, this means that for each $\frac{1}{200}$ of an inch of the travel of the cone 38, each ball 35 will be forced outwardly to the distance of $\frac{1}{1000}$ of an inch. As there are two such balls in a diametrical relation to each other, this means that the combined displacement of the two balls will amount to $\frac{2}{1000}$ of an inch. To put it reversely, the radial expansion of the two balls 35 to the extent of $\frac{2}{1000}$ of an inch will be indicated by the movement of the plunger 15 to the distance of $\frac{2}{10}$ of an inch. Thus, a change of each $\frac{1}{1000}$ of an inch in the length of the diameter will be indicated by $\frac{1}{10}$ of an inch on the above-said calibrations.

Obviously, the ratio of the magnification obtained in the above manner may be changed by a change in the pitch of the respective threads and the angle of incline of the cone 38, or both, and the actual variations in the length of the diameter would be shown by calibrations as read with respect to the end of plunger 15.

It will be understood that some changes may be made in the structure of the gauge without departing beyond the range of the invention disclosed herein.

What I, therefore, wish to claim is as follows:

1. An internal diameter gauge comprising a tubular housing, an axially-movable plunger within one end thereof, the plunger having a fluted axial bore, the plunger and the housing being engaged by helical thread means to impart to the plunger, in the course of its axial movement, a turn about its axis, a stationary cylindrical member at the other end of the housing, the member including a shank axially secured with the housing and having a threaded axial bore, a head integrally connected to the shank and extending outwardly therefrom, the head containing an axial, funnel-shaped cavity and being provided with a plurality of apertures leading radially from the cavity outwardly, a stem threaded into the axial bore of the shank, a fluted shaft extending from the stem into the fluted bore of the plunger for a sliding telescopic engagement therewith, the plunger and the stem being adapted to rotate as a unit about their common axis, a cone disposed within said cavity and connected axially at its constricted end to the opposite end of the stem, a plurality of movable elements radially contacting said cone, each movable element being disposed separately in one of said apertures, said movable elements being adapted to be shifted by the cone outwardly through said apertures, the stem having, per a unit of length, a number of threads for each thread of the said helical thread means, and calibrated means at one end of the housing to indicate the length of the movement of the plunger.

2. An internal diameter gauge comprising a tubular housing, a plunger axially disposed in one end portion of the housing for longitudinal movement therein, a stationary member at the other end of the housing, the member including a shank axially disposed within the housing and a head extending from the shank and forming the operative end of the gauge, the head having an axial, funnel-shaped cavity and a plurality of apertures radially leading therefrom outwardly, a stem threaded into the shank, a shaft extending from one end of the shank for a sliding telescopic relation with the plunger, the plunger and the shaft being adapted to rotate as a unit about their common axis, a cone axially connected at its restricted end to the stem, the cone being disposed within said funnel-shaped cavity, a free moving ball in each of said apertures, the ball being in contact with the cone and being adapted to be moved thereby outwardly, helical threaded means along the plunger for inter-engagement of the plunger and the housing to impart to the plunger, in the course of its longitudinal movement, a turn about its axis, spring means to hold the plunger normally in a yieldingly-spaced relation to said head, calibrated means on the housing to indicate the length of the movement of the plunger, the stem containing for a unit of length a number of threads as against each thread of the threaded helical means along the plunger, and a jacket enclosing said head and said balls but having apertures for movement of the balls outwardly.

3. An internal diameter gauge including a tubular housing, a cylindrical member at one end thereof, the cylindrical member being provided with an axial, funnel-like cavity, a shank integrally formed with the cylindrical member and disposed axially within one end portion of the housing, the shank having an axial threaded bore, a stem disposed within said bore and having a threaded portion in mesh with the threaded interior of the stem, a shaft extending from one end of the stem inwardly into the housing, a cone axially connected at its constricted end to the other end of the stem and disposed within said cavity, a pair of balls in radial contact with the cone, the balls being in a diametrical relation to each other, a plunger disposed within the opposite end of the housing for a sliding, telescoping relation with said shaft, the shaft and the plunger being adapted to rotate as a unit about their common axis, spring means to keep the plunger normally in a yielding, spaced relation to said stem, a rod extending from the opposite end of the plunger outwardly of the housing, the outer surface of the plunger being provided with a helical groove for engagement with a stationary member extending into the groove from the inner surface of the housing, the housing being provided with calibrations to indicate the extent of the longitudinal movement of the plunger.

4. An internal diameter gauge including a tubular housing, a cylindrical member at one end thereof, the member including a tubular, internally-threaded shank axially disposed in said end, a hollow head extending outwardly from said shank, the head being provided with a plurality of radial apertures, a stem axially disposed within the shank in mesh with the threaded inner surface thereof, a cone disposed in the hollow head and having its constricted end axially secured to said stem, a plurality of free balls in contact with the side surface of the cone, a shaft extending from the opposite end of the stem towards the other end of the housing, a spring-biased plunger associated with the shaft in a sliding telescopic relation thereto and adapted to impart to the shaft, in the course of its telescopic movement to the distance of one unit of length, a complete revolution about the axis of said shaft, while the threaded portion of the stem contains a plurality of screw threads for the same unit of length, component elements of the gauge bearing calibrations to indicate the extent of the longitudinal movement of the plunger.

References Cited in the file of this patent

UNITED STATES PATENTS

| | | |
|---|---|---|
| 1,423,542 | Rockwell | July 25, 1922 |
| 2,456,497 | Forsmark | Dec. 14, 1948 |